United States Patent [19]

Baziw

[11] Patent Number: 5,177,709
[45] Date of Patent: Jan. 5, 1993

[54] METHOD FOR DETERMINING VELOCITY AND CONFIDENCE LEVEL OF ACOUSTIC WAVES IN PENETRABLE GROUND

[76] Inventor: Erick J. Baziw, 3432 West 23rd Ave., Vancouver British Columbia V6S 1K3, Canada

[21] Appl. No.: 778,790

[22] Filed: Oct. 7, 1991

Related U.S. Application Data

[63] Continuation-in-part of Ser. No. 409,492, Sep. 19, 1989, abandoned.

[51] Int. Cl.⁵ .............................................. G01V 1/28
[52] U.S. Cl. ..................................................... 367/38
[58] Field of Search ...................... 367/38, 40, 59, 60; 364/421

[56] References Cited

U.S. PATENT DOCUMENTS

| | | | |
|---|---|---|---|
| 3,417,370 | 12/1968 | Brey | 367/40 |
| 4,367,541 | 1/1983 | Seeman | 367/34 |
| 4,499,954 | 2/1985 | Diggle | 73/84 |
| 4,712,641 | 12/1987 | Chelminski | 367/75 |

OTHER PUBLICATIONS

Baziw, E. J., Application of Digital Filtering Techniques for Reducing and Analyzing In-Situ Time Series, MASc Thesis, Dept. of Civil Engng., Univ. of British Columbia, 1989.
Campanella, R. G., Baziw, E. J., and Sully, J. P., "Interpretation of Seismic Cone Data Using Digital Filtering Techniques", presented at the International Conference on Soil Mechanics and Foundation Engineering, Rio de Janeiro, Aug. 1989.
Campanella, R. G., et al., "The Seismic Cone Penetration Test", Proc. Insitu '86. ASCE Geot. Spec. Publ. No. 6, Jun., pp. 116–130.
Hamming, R. W., *Digital Filters*, Prentice Hall Inc., Englewood Cliffs, N.J. p. 226.
Kanasewich, E. R., *Time Series Analysis In Geophysics*, 3rd Ed., University of Alberta Press, 1981, pp. 53–61.
Laing, N. L., Sources and Receivers with the Seismic Cone Test, MASc. Thesis, Dept. of Civil Engng., Univ. of British Columbia, 1985.
Ohya, S., "In-Situ P and S Wave Velocity Measurement", Unknown publisher, pp. 1218–1235.
Stokoe, K. H. & Hour, R. S., Variables Affecting In-Situ Seismic Measurements, Proc. Conf. Egke--Engng. & Soil Dyn., ASCE, Pasedena, 2: pp. 919–939, 1978.
"Seismic CPT To Measure in situ Shear Wave Velocity," Robertson et al., J. Geotech Eng., Amer. Soc. Civil Eng., vol. 112, #8, Aug. '86.

*Primary Examiner*—Ian J. Lobo

[57] ABSTRACT

Seismic traces are singularly acquired, digitally converted, normalized according to mean and amplitude, visually displayed for qualitative evaluation, and recorded in conjunction with relevant environmental (acquisition) details. Related pairs of data with differential vertical offsets so recorded are digitally bandpassed according to user specification, limits of dominant waveforms determined with respect to time, crosscorrelated to determine time offset, and average waveform velocity estimated over the depth increment under study, based on the determined time offset and the estimated waveform travel path distance difference.

6 Claims, 11 Drawing Sheets

M = period of cosine bells (approximately 10 percent of the existing data).

2L = 80 percent of the length of the time series.

METHOD FOR DETERMINING VELOCITY AND CONFIDENCE LEVEL OF ACOUSTIC WAVES IN PENETRABLE GROUND

This is a continuation-in-part of application Ser. No. 07/409,492, filed Sep. 19, 1989. Parent application Ser. No. 07/409,492 is now abandoned.

FIELD OF INVENTION

The present invention lies in the field of geotechnical in-situ engineering. More particularly, the invention relates to a processing method for use on seismic data obtained during the Seismic Cone Penetration Test (Campanella et al, 1986) and estimates shear and compression wave velocities for the determination of dynamic soil parameters to be used in foundation and earthquake engineering design.

BACKGROUND OF INVENTION

There is considerable interest in methods of geotechnical in-situ engineering which enable shear and compression wave velocities in the ground to be accurately estimated, because such measurements provide insight into the response of soil to imposed loads such as buildings, heavy equipment, earthquakes, and explosions. These velocities are desired because they form the core of mathematical theorems which describe the elasticity/plasticity of soils and are used to predict settlement, liquefaction and failure. As such, accuracy in the estimation of shear and compression waves is of paramount importance because these velocities are treated exponentially during the calculation of geotechnical parameters such as the small strain shear modulus, Poisson's Ratio, and Young's Modulus (Ohya, 1982, pp. 1220).

Two methods have developed over the years and are widely used to indirectly estimate these predictive parameters mentioned above: the Standard Penetration Test (SPT) and the Cone Penetration Test (CPT). These tests use empirical correlations, developed with large amounts of data, to relate certain measurements taken during the course of these tests to values for the geotechnical parameters mentioned above. However, these empirical correlation relationships are subject to large variances, and therefore require large factors of safety to be employed when using these values in construction design. Accordingly, industry desired an accurate and reliable method for directly deriving seismic velocities.

For that purpose the Seismic Cone Penetration Test (SCPT) (an extension of the Cone Penetration Test (CPT) was devised to measure seismic velocities directly through data obtained by an installed seismic sensor in the cone penetrometer, in addition to the standard bearing pressure, sleeve friction, and pore pressure sensors. As the cone penetrometer is advanced through the ground, using a pushing force, the advance is halted at one meter (or other such increment) intervals. When the cone is at rest, a seismic event is caused at the surface using a hammer blow or explosive charge, causing seismic waves to propagate from the surface through the soil to be detected by a single seismic sensor installed in the cone penetrometer. This event is recorded and the penetrometer is advanced another increment and the process is repeated. By visually comparing the arrival times of the constituent waveforms integrated in different seismic records obtained from the same probe hole, it is possible to estimate the average velocities of said constituent waveforms over the depth increment under study. This method is known as a pseudo-interval technique in that it utilizes two different seismic events recorded by a single receiver at different depths, versus a true interval technique which would compare the same seismic event utilizing two seismic receivers at different depths.

The determination of velocity from SCPT data is made difficult when low, medium or high frequency noise is present in the recorded traces, and often masks or influences the ideal responses through constructive and/or destructive interference. This problem of noise introduces uncertainty into seismic velocity estimations and results in variances perceived to be as great as those of the empirical correlation methods.

BRIEF SUMMARY OF THE INVENTION

This invention relates a processing method for determining wave velocities and accuracy estimates from data obtained during Seismic Cone Penetration Testing (SCPT). The process improves upon the existing visual estimation methods and allows the use of more sensitive receiving devices, such as accelerometers, for detecting seismic events. The widespread use of this processing method has the potential for refining existing empirical correlations used in foundation design and also for directly calculating design parameters using known mathematical relationships.

The practice of SCPT data acquisition is effected little by the implementation of the invention, except that more sophisticated devices can be used for sensing the seismic event and processing the data once it is recorded. The primary object of the invention is to present an interactive data processing method whereby the shear or compression wavelets contained in related pairs of seismic traces having different vertical offsets can be isolated by utilizing a user specified digital bandpass (frequency) window and their relative time offset determined using a modified crosscorrelation algorithm. This time offset is then used to calculate the average velocity over the depth under study which is stored, along with calculated accuracy statistics, in an electronic form which can then be appended to in order to create a database for plotting the soil profile or calculating related parameters. An ancillary improvement of the invention over the existing standard methods provides for the placement in the data record all relevant details concerning the data during recording to minimize repetitive notetaking and further speed data processing.

The invention actually processes the data in two parts: both during and subsequent to acquisition. During acquisition, the data is processed by removing any DC shift, normalizing the data amplitudes so they will contribute equally to the crosscorrelation function, displaying the data for qualitative evaluation by the user, and recorded in a file in conjunction with acquisition details such as depth, sampling rate, trigger delay, and the X and Y offset from the probe hole. Subsequent to acquisition, the invention tapers the time domain of the data by applying a Hamming-Tukey window to remove discontinuities or "leakage" (Gibb's phenomena) in the frequency domain, optionally examines the frequency spectra of the seismic traces by taking a Fast Fourier Transform for waveform identification by the user, applies a digital bandpass filter to isolate the waveform of interest, determines the limits of the dominant waveforms with respect to time, crosscorrelates the waveforms for the interval defined by the limits of the dominant waveforms utilizing $\tau$ as the variable, determines the crosscorrelation value for the point at which the waveforms are most highly correlated ($\tau^*$), makes the necessary travel path vector corrections to determine the distance travelled over the time delay $\tau^*$, determines the velocity of the wavelet under study based upon difference in waveform travel distance divided by $\tau^*$, and determines a value for the accuracy of the calculated velocity at $\tau^*$, based upon the crosscorrelation value divided by the variance of the two traces.

BRIEF DESCRIPTION OF THE DRAWINGS

These and other objects and advantages of this invention and a better understanding of the principles of the invention will be evident from the following descriptions taken in conjunction with the appended drawings, in which.

DESCRIPTION OF THE PRIOR ART

Figure 1:
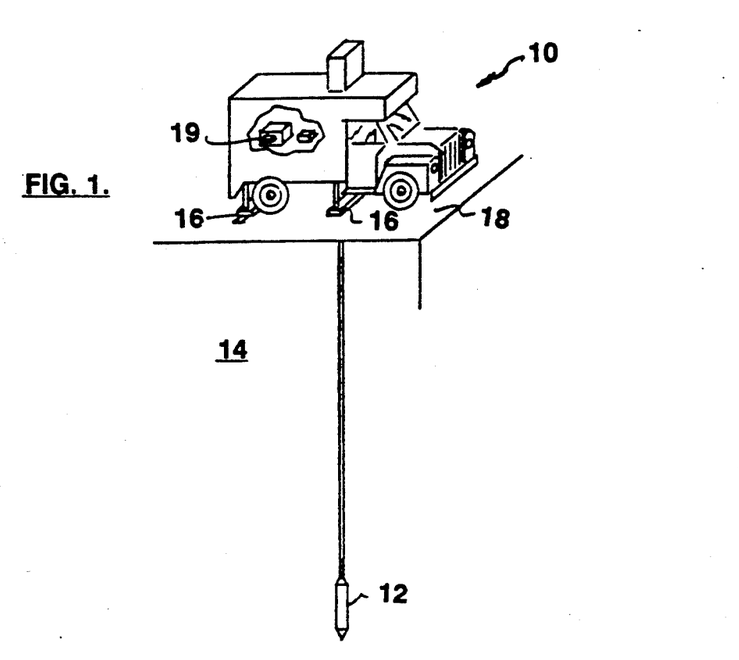
FIG. 1 illustrates SCPT testing apparatus in use in a body of ground.

Referring to FIG. 1, which shows the prior art SCPT apparatus in a body of ground, a testing vehicle (10) is employed to advance a seismic cone (12) downwardly into a body of ground (14), with the vehicle (10) supported on pads (16) on the surface of the ground (18). The vehicle (10) contains a digital recording oscilloscope (19), for the purpose of processing the data sensed by the seismic cone (12).

The seismic cone (12) is a commercially available cone penetrometer which contains, (among other transducers) a geophone (not shown) for detecting seismic waves penetrating through the ground.

When this apparatus is in use, the SCPT cone (12) is advanced to a predetermined depth. The apparatus is now ready to begin acquiring data for the purpose of estimating shear and/or compression wave velocities.

A seismic event is generated at the surface, triggering a recording oscilloscope (19) to begin recording data by means of an electronic ground or acoustic trigger. This seismic event can be generated by using an explosive charge (Buffalo Gun), a hammer blow to the pads (16), or other device (Chelminski, 1984).

Figure 2:
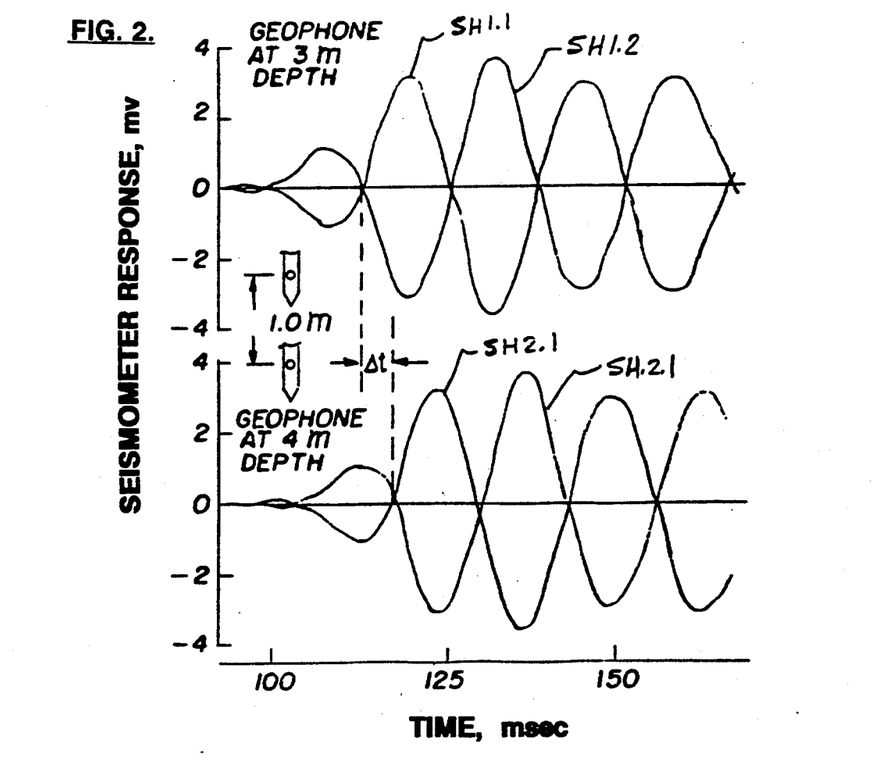
FIG. 2 illustrates of idealized horizontally polarized shear wave traces obtained from apparatus of FIG. 1.

One prior art method for determining shear wave velocities is the Reverse Polarity Method (RPM), also known as the crossover technique. This technique, referring to FIG. 2, requires two events (SH 1.1 and SH 1.2) to be recorded at the same depth that are polarized 180° out of phase. Once they are recorded, these horizontally polarized (SH) wavelets are superimposed upon each other (FIG. 2) and one of the points at which the SH waves cross over each other would be visually chosen as the arrival time for this depth. Consequently, it is necessary to use two seismic waves to determine one reference arrival time. This process is repeated for the next depth increment (SH 2.1 and SH 2.2), and the difference between the arrival times of the two crossover points chosen ($\Delta t$) would determine the average SH wave velocity over that depth increment (3 meters to 4 meters).

One major drawback of the crossover technique, aside from its reliance on visual inspection, is that it cannot be used to determine compression wave velocities because these wavelets cannot be practicably polarized 180° out of phase with the SCPT apparatus. Hence, SCPT investigators rely on another method to estimate compression (P) wave velocities, that is visually estimating the arrival time from the raw or heavily filtered geophone data (Laing, 1985).

Figure 3:
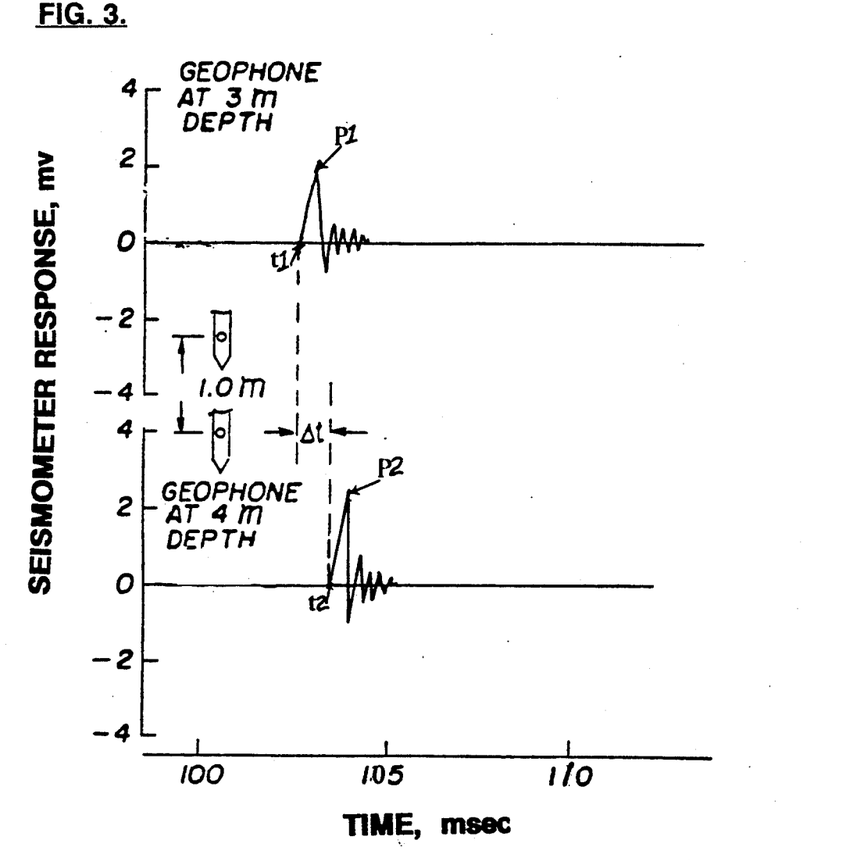
FIG. 3 illustrates idealized compression waves obtained from apparatus of FIG. 1.

This visual estimation of arrival times is used for unpolarized sources such as the Buffalo Gun (which produces a good seismic compression wave), where, referring to FIG. 3, the first arrival (T1) of the pressure wave (P1) is visually selected from the recorded data. This action is then repeated for the next depth increment and the arrival time (T2) for the pressure wave (P2) would be visually estimated. Again, the difference of the arrival times (T2−T1) of the two waves ($\Delta t$) would determine the average wave velocity over this depth increment.

Figure 4A:
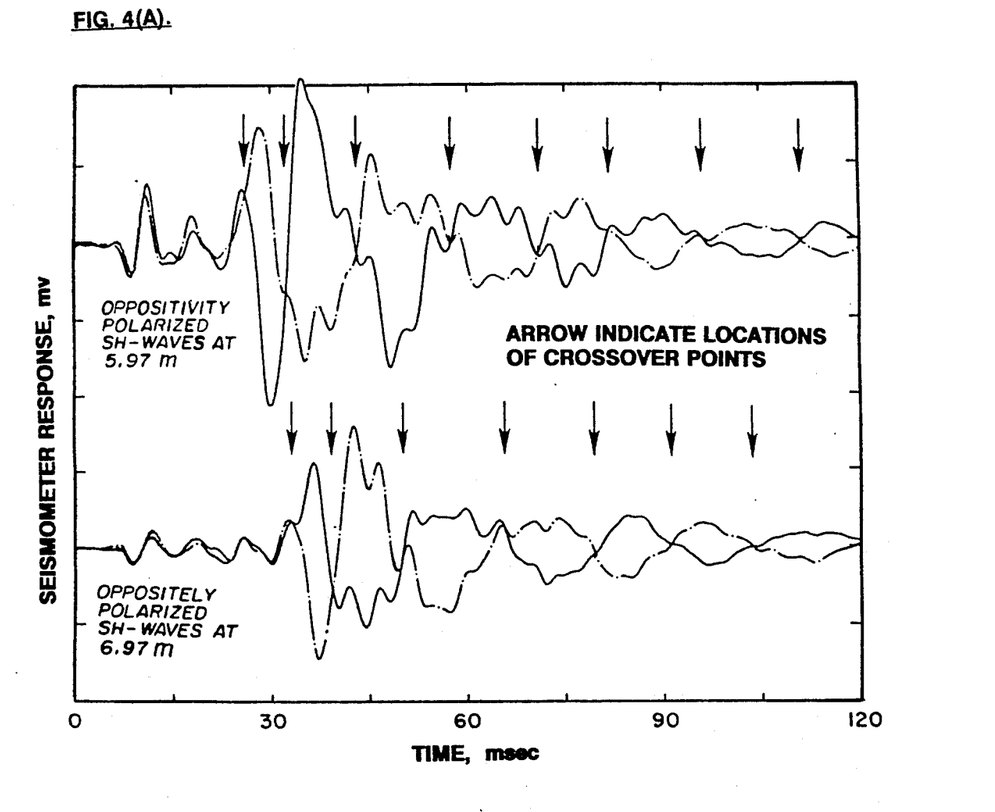
FIG. 4(A) illustrates actual reversely polarized seismic traces acquired by the prior art testing apparatus in FIG. 1 using analog filters.
Figure 4B:
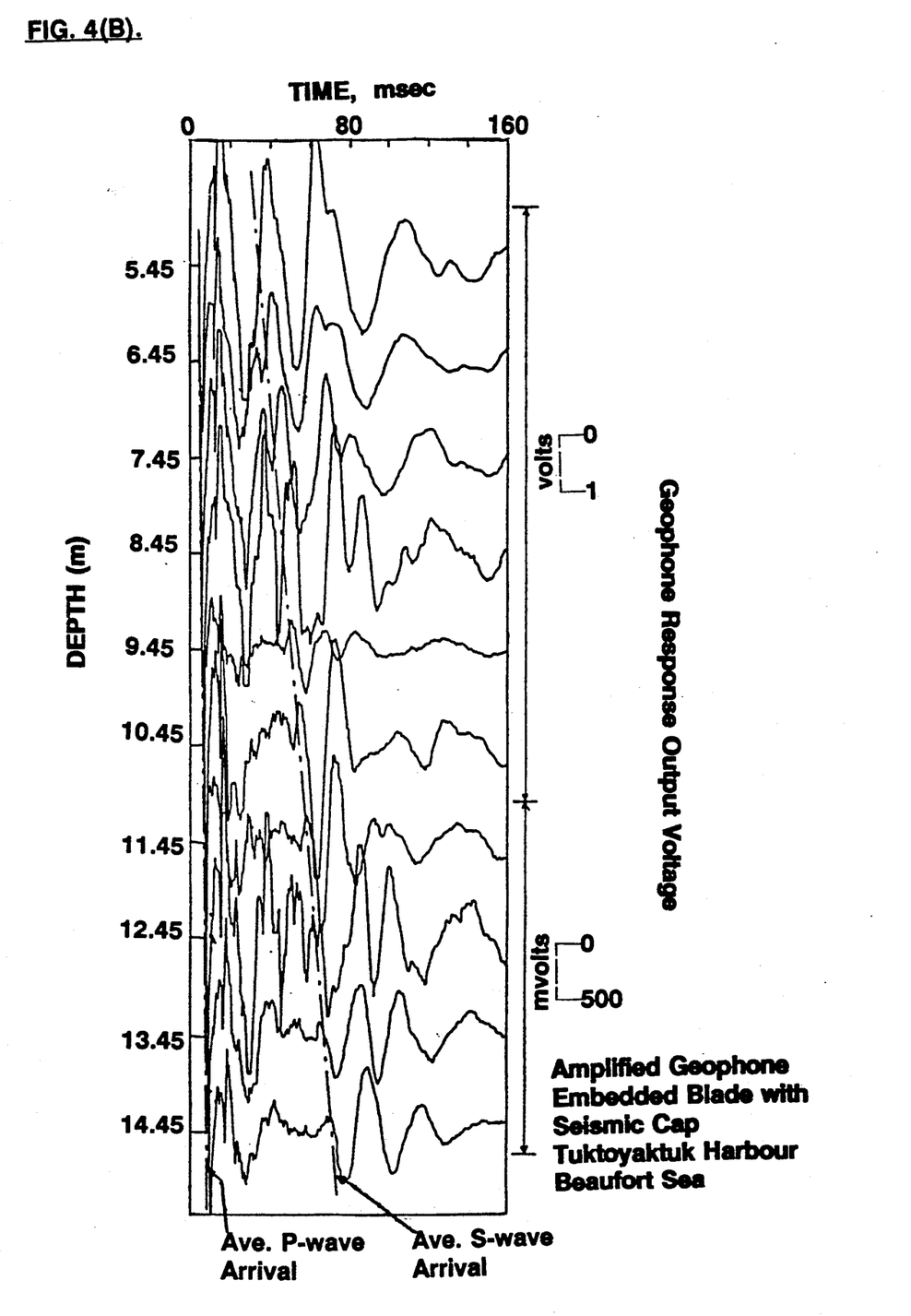
FIG. 4(B) illustrates actual seismic data profile acquired by the prior art testing apparatus in FIG. 1 using analog filters.

In both of these methods, the determination of the crossover point or first arrival time is made difficult when low, medium and/or high frequency noise is present in the recorded traces, and often mask the ideal responses (FIGS. 4(A) and 4(B)). This noise is especially prevalent in the rare case where an accelerometer (versus a geophone) is used for sensing the data. Analog filtering has been employed in the past to reduce this noise, but these filters introduce other effects of their own, such as phase shift, which vary with temperature and frequency. Stokoe and Hoar (1978) have strongly suggested that this type of filtering should be minimized since it can significantly distort the true signal and lead to the estimation of erroneous arrival times.

Another drawback of the crossover method is that a consistent method must be used over a given site. For example, an investigator may decide to use the second crossover point, but may find this choice inappropriate at a different depth because of instrument response or frequency variation caused by soil layering (Laing, 1985). Thus, for this reason and the others stated above, the estimation of SH wave velocities based on crossover points can in practice present substantial difficulty to SCPT investigators. Compression wave velocities are similarly difficult to obtain using present methods: not only must arrival times be estimated from raw noisy data without reference to a crossover point, but also the velocity transducer (geophone) employed for its insensitivity to noise can influence the acquisition of the higher frequency compression wave because of its slow response (high time constant), a characteristic which industry has dubbed "smearing".

The above-discussed disadvantages of the prior art method can be overcome by the use of the invention which uses digital bandpass filtering and modified crosscorrelation algorithms to calculate the velocities of the dominant waveforms (SH or P) contained in the seismic trace. In addition, the invention mitigates the need for the generation of reversely polarized traces, thereby reducing data requirements, and lends its user the option of utilizing accelerometers, versus geophones, for detecting seismic data.

DESCRIPTION OF THE PREFERRED EMBODIMENT

Referring now to the drawings, there is now shown in FIG. 1 a prior art SCPT testing system involving a cone penetrometer (12), driven into a body of ground (14), and a reactionary force (16) for non-explosive energy sources, on the surface of the ground (18).

In addition, there is a high speed computer system (19) containing an A/D board (not shown) and triggering mechanism for acquiring, displaying, processing, and recording the seismic data.

There is a seismic source produced by impacting the reactionary force (16) with a large sledgehammer (or explosive charge or other device) which causes a seismic wave to propagate through the ground adjacent to the probe hole, to be sensed by the cone penetrometer (12) which contains an accelerometer (or geophone) sensing unit (not shown). The seismic wave (not shown) contains both shear (SH) and compression (P) wave components.

Figure 5:
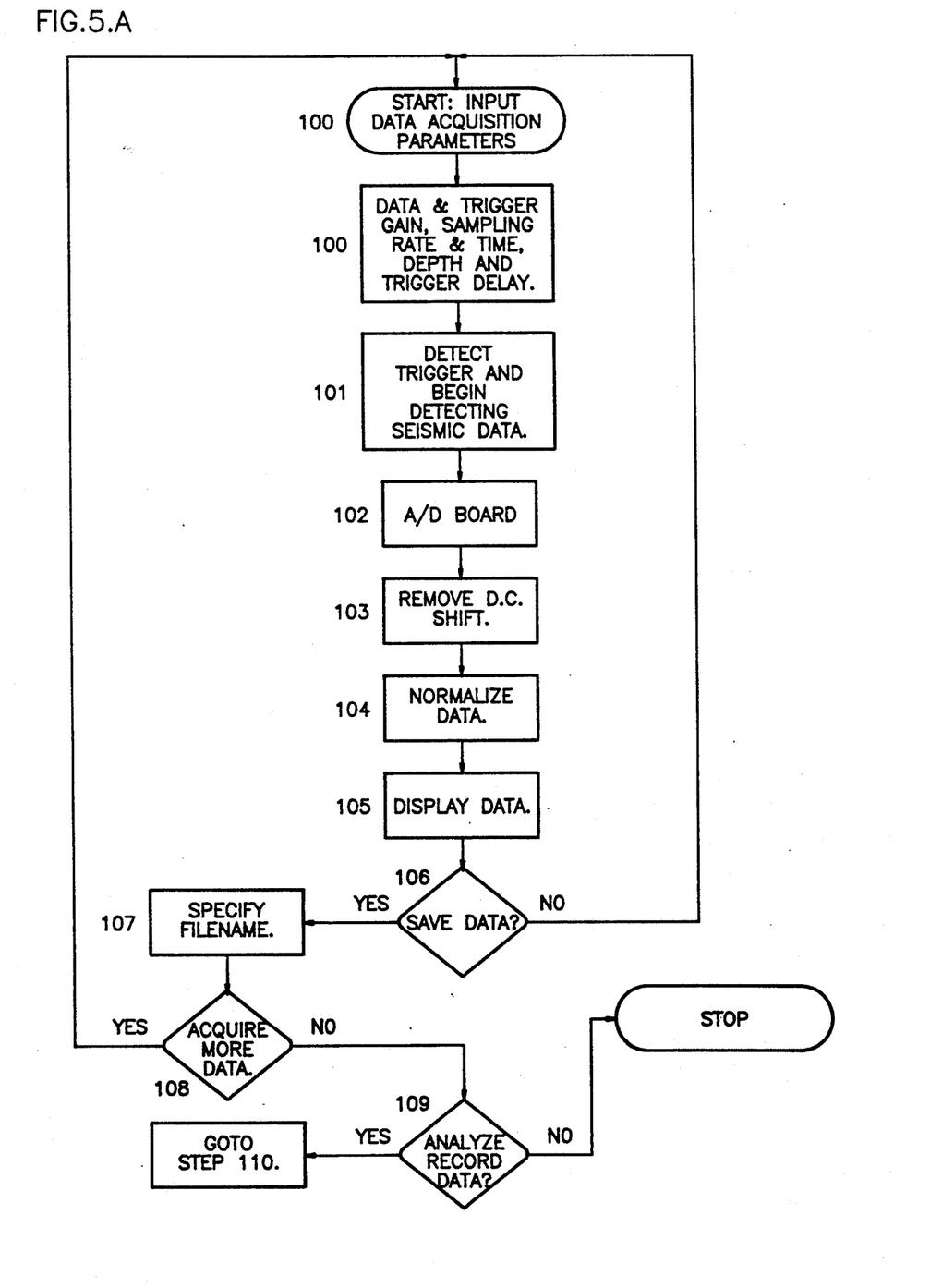
FIG. 5(A) Flow chart illustrates the signal processing method used recording data in the present invention.
FIG. 5(B) Flow chart illustrates the signal processing method used on previously recorded data in the present invention.

Referring now to FIG. 5(A), the invention requires user-specified input (100) prior to data acquisition. Specifically, each record must be defined in terms of triggering source (electronic ground or acoustic trigger), sampling rate, sampling time, probe depth, X offset of seismic source (horizontal displacement from the probe hole), Y offset of the source (vertical displacement from the surface of an explosive charge or other seismic source), and data gain (amplification of seismic trace in decibels). Once these parameters are specified (100) the user is ready to begin acquiring data.

The standard MS-DOS based computer configuration cannot accept a ratio of sampling time divided by sampling rate of greater than 8191 at this time because of its fixed buffer size.

Using an electronic trigger (101), the invention receives data sensed by the cone penetrometer through cabling for a user specified time period (100). The analog signal sensed by the accelerometer is then converted to its digital representation using a commercially available A/D board (102). Generally this apparatus involves multiplexing and analog to digital conversion as is well known in the art. Next, the DC shift of the signal is removed in order to make the mean signal amplitude equal to zero (103), and the signal amplitude is normalized to make the amplitudes range in the 1.0 to −1.0 unit scale (104). The data is then displayed (105) on a standard CRT or LCD screen for qualitative evaluation by the user. If the user is not satisfied with the results they can respecify the input parameters to begin acquiring the data again.

If the user is satisfied with the results, he/she is prompted to specify a file name (107) for the data to record the data in digital form. The data is then stored in a permanent digital format on computer media in the following order: sampling rate, depth, X and Y offset, trigger delay, and seismic time series data. The user is then prompted to acquire more data (108) or begin processing already-acquired data (110) if two or more traces have already been recorded in the aforementioned manner.

The removal of DC shift is necessary when applying crosscorrelation to seismic wavelets. D.C. shift occurs when the recorded signal is not centred at zero mean. By considering the following equation for the crosscorrelation function, d.c. shift can be illustrated.

$$\Phi_{xy}(\tau) = \sum_{k=0}^{N-\tau} X_k Y_{k+\tau} \qquad \text{Equation (1)}$$

where, $\Phi_{xy}(\tau)$ is the crosscorrelation function
$Y_k$ is the sampled data at depth 1, at sample time k
$X_k$ is the sampled data at depth 2, at sample time k
$\tau$ is the shift between the two sets of recorded wavelets.

First we manipulate equation (1) by shifting one signal relative to the other, that is $X_k' = X_k + C$ where C is an arbitrary constant. In this case equation (1) becomes, $$\begin{aligned}
\Phi_{XY}(\tau) &= \sum_{k=0}^{N-\tau} X_k' Y_{k+\tau} \\
&= \sum_{k=0}^{N-\tau} (X_k + C) Y_{k+\tau} \\
\Phi_{XY}'(\tau) &= \Phi_{XY}(\tau) + \sum_{k=0}^{N-\tau} C Y_{k+\tau}
\end{aligned} \qquad \text{Equation (2)}$$

Equation (2) clearly shows that the D.C. shift would result in a misrepresentative crosscorrelation value. The D.C. shift is removed by first calculating the mean of the entire time series and then subtracting the calculated mean from each data point in the seismic trace.

Data normalization (104) is also required when applying crosscorrelation to seismic wavelets. In order to make each seismic trace contribute equally to the crosscorrelation function, the absolute value of maximum amplitude of each trace recorded during the acquisition process is made equal to ±1.0 units and each corresponding data point weighted to its relative value in the 1.0 to −1.0 unit scale. This is performed to minimize the effect of computational quantization and/or roundoff errors during the crosscorrelation process, as well as regulate and optimize the performance of the interactive graphics algorithms.

Data display (105) is performed so the user can assess the quality of the trace itself. Clipping, for example, caused by exceeding the receiving device's maximum amplitude, would necessitate another sounding. As such, a trace whose maximum amplitudes are noticeably clipped would be discarded, and another sample taken for that depth. (As an example, this instance could be rectified by decreasing the data gain (100) prior to taking another trace).

Data is saved (106) and a file name specified (107) in conjunction with its related acquisition details if the user is satisfied with the displayed trace. This is performed to minimize the possibility of transcription errors, as well as to avoid having to input these unique details repeatedly, thereby reducing processing time. The data is saved in digital format on computer media in the following order: sampling rate, probe depth, X offset of seismic source (horizontal surface displacement from the probe hole), Y offset of the source (vertical displacement from the surface of an explosive charge or other seismic source), and trigger delay.

After two or more seismic traces have been acquired using the aforementioned manner, velocities can be determined. The user specifies the file names of two recorded traces (110) to be processed. Each file record contains the specified input parameters (100) necessary to proceed and determine velocity.

Figure 6:
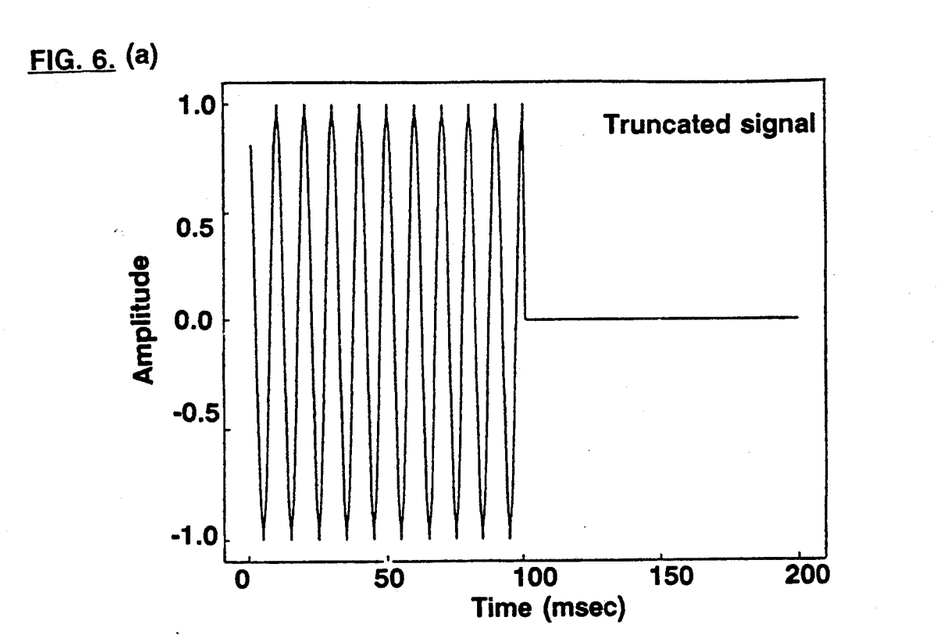
FIG. 6(a) and 6(b) Illustration of Gibb's Phenomenon ("leakage") in the frequency domain.
Figure 7:
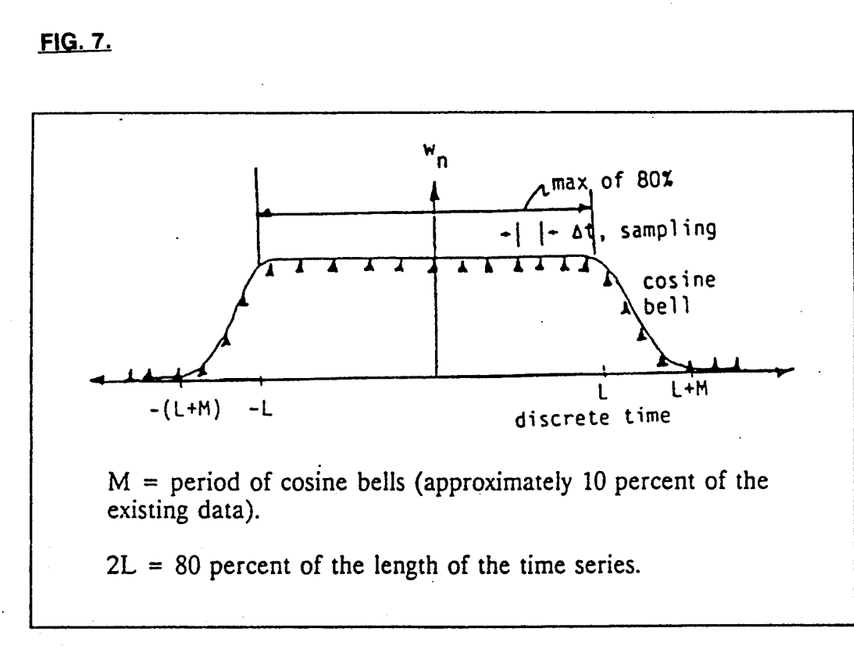
FIG. 7 illustrates the tapering effect of the Hamming-Tukey window.

The traces' depths are compared (111) to guard against negative velocity calculation, and, if appropriate, the time domains are tapered (112) using a Hamming window. The Hamming window (Hamming, 1977) considers the distortions that may be present within filtered signals, or, more specifically, the effect that truncation has in the frequency domain. A truncated signal is analogous to multiplying the signal with a boxcar function in the time domain which results in distortions or "leakage" in the frequency domain (FIG. 6a and 6b). As the signal recording time increases, "leakage" becomes less prevalent because more information of the signal is retained. This concept is illustrated in FIG. 6(a) where a 100 Hz cosine signal is being multiplied by a boxcar function. FIG. 6(b) illustrates the "leakage" effect in the frequency domain. In order to remedy Gibb's Phenomenon (i.e. the "leakage" effect) the data needs to be tapered. The Hamming window tapers the time series data with a pair of cosine bells, where the first and last points of the trace approach the mean value of the series, being zero. FIG. 7 illustrates the tapering of the Hamming window. In this figure, M determine the period of the cosine bell (i.e. rolloff of the window), and 2L is 80 percent of the length of the time series. Hamming (1977) recommends that M be about 10 percent of the existing data with 80 percent in the flat part of the window. The data can then be padded with zeros. In this way, there are no discontinuities to initiate transients (i.e. Gibb's phenomenon) during the Fast Fourier Transform.

After the time domains are tapered (112), the user must decide (113) whether he/she would like to analyze the frequency spectra of the data. This is provided in order to evaluate the frequency range in which the desired wavelet (S or P wave) resides at a particular site. If the particular properties of the site are well known, the user will specify the bandpass window to be applied (116) in accordance with the wavelet to be isolated.

If the frequency spectra of the traces need to be analyzed, an algorithm which computes the simultaneous Fast Fourier Transform of the two data sets (114) is applied (E. R. Kanasewich, 1981). The original traces and their corresponding frequency spectra are then displayed (115). The user is then prompted to specify a bandpass window to be applied to the data sets (116) in accordance with the desired waveforms (SH or P) to be isolated.

However, in order to apply the bandpass filter described below, it is first necessary to modify the data and the filter itself so that aliasing problems are removed. Aliasing arises when Butterworth-type filters attempt to filter frequencies higher than the Nyquist frequency ($\frac{1}{\Delta}$) within the sampled data. The bilinear Z transform (Kanasewich, 1981) is applied (117) to the continuous angular frequencies, w, in the equation below in order to convert them to sampled or discrete values and keeps the highest filtered frequency component within the Nyquist frequency of the sampled data.

Figure 8:
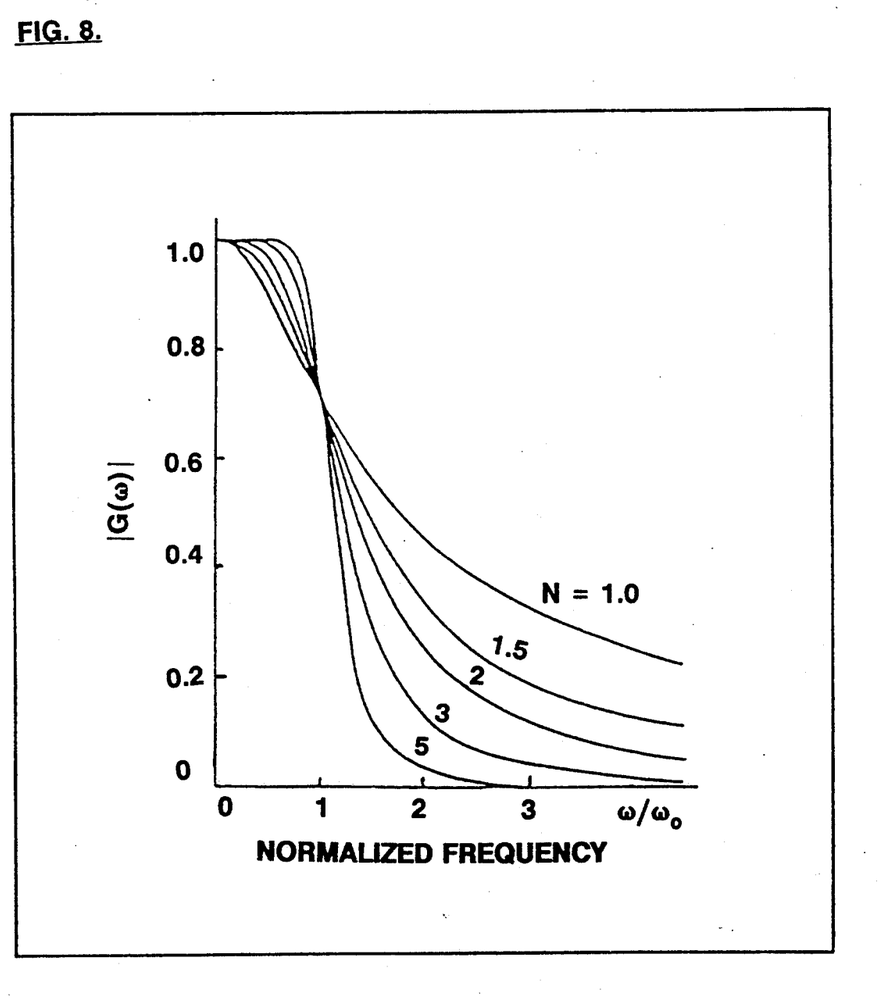
FIG. 8 illustrates a Butterworth-type filter's effect on rolloff for various values of N.

The bandpass filter applied (118) in this process is of a Butterworth type, and can be defined generally, for the low-pass case, by the following:

$$|G(w)|^2 = 1/\{1+(w/w_o)^{2N}\} \qquad \text{Equation (3)}.$$

where $w_o$ is the cutoff frequency and N determines the sharpness of the cutoff. Characteristics of $|G(w)|$ for various values of N are shown in FIG. 8. Kanasewich (1981) recommends that "the Butterworth-type function, which yields an optimum filter where the signal and noise are clearly separated in bands, be used wherever simple low pass, high pass, or bandpass filter is required." Since this was found to be the case in SCPT testing, this type of filter was chosen. The advantages associated with this Butterworth-type filter are as follows:

Their transfer functions are smooth and maximally flat both inside and outside the passband.

The squared filter (i.e. the input is filtered twice so that amplitude response is $|G(w)|^2$) produces zero phase shift and its power is 3 dB (factor of $\frac{1}{2}$) at the cutoff frequency. The cutoff frequency determines the half-power point of the filter.

The high pass filter used in the invention is the inverse of the low pass filter (Equation 3) and the bandpass used is a combination of both the high and low pass filters. Referring to FIG. 8, the value of N specifies the rate of attenuation for the bandpass where a larger value of N gives a greater rate of attenuation and "leakage" effect (Gibb's phenomenon). The order of the filter was chosen as four (4) in order to optimize computation time and frequency isolation for the SCPT application.

Figure 9:
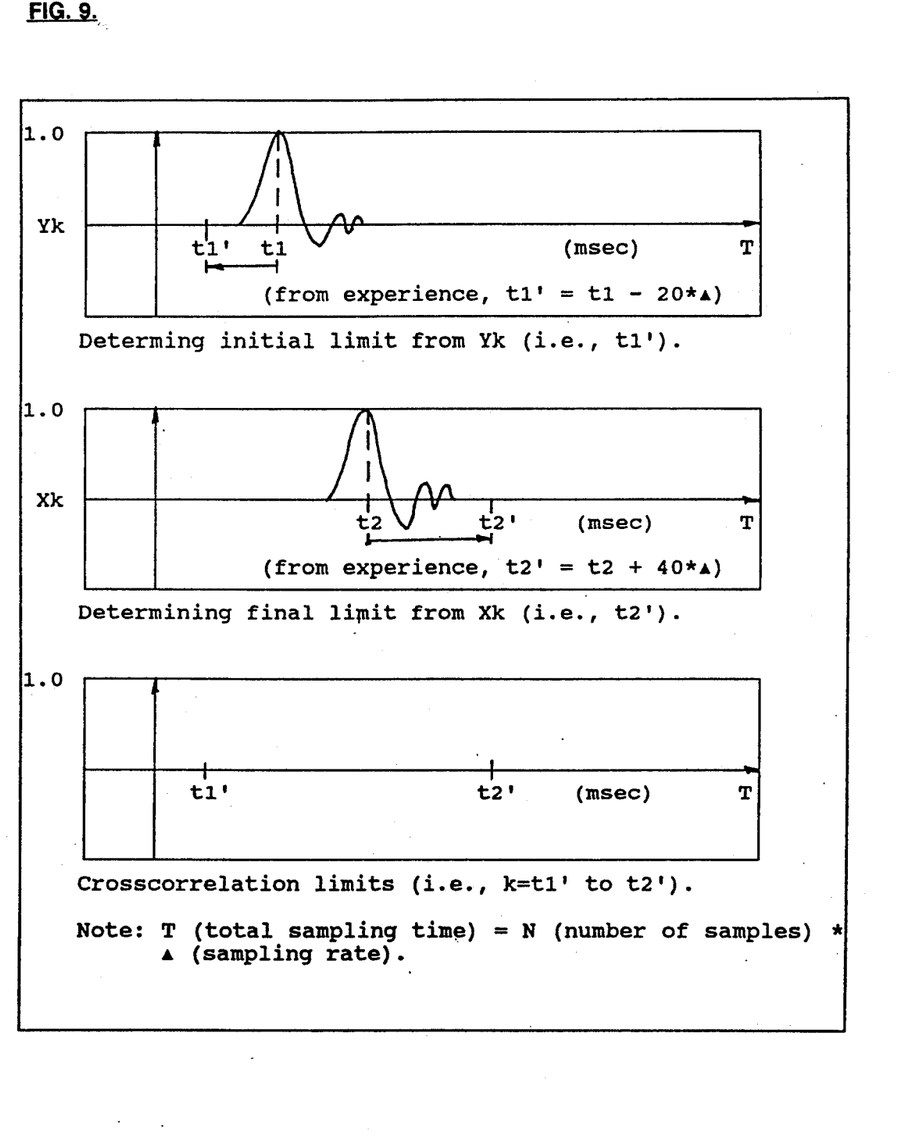
FIG. 9 illustrates the determination of limits for the dominant waveforms with respect to time.

After the bandpass filter applied (118), the data is optionally displayed (120) or refiltered (121), prior to the crosscorrelation (123) of the two filtered traces. However, because of the statistical nature of the crosscorrelation and the amount of computations necessary to perform same, the limits of the dominant waveforms contained in the two filtered traces are determined (122) with respect to time. This procedure (122) saves substantial computing time because it limits the crosscorrelation procedure (123) to the time domain in which the dominant waveforms lie (refer to FIG. 9), which is only a small proportion of the total sampling time (defined in step 100). Referring to FIG. 9 and Equation (1), we have $$\Phi_{XY}(\tau) = \sum_{k=0}^{N} X_k Y_{k+\tau}, \text{ but in order} \qquad \text{Equation (4)}$$

to save computation time, the limits are redefined as $$\Phi_{XY}(\tau) = \sum_{k=\frac{i_1}{\Delta}}^{\frac{i_2}{\Delta}}, \text{ e.g., If } N = 4096 \text{ and}$$

$\frac{t_1}{\Delta} = 180$ and $\frac{t_2}{\Delta} = 270$, the computation is reduced from initial (i.e., for $\tau = 0$) $2*(N - \tau) = 8192$ multiplications and additions to $2*(270 - 180 - \tau) = 180$ multiplications and additions. Further, $\tau_{max}$ is reduced from $\tau_{max} = N = 4096$, to $\tau_{max} = 90$.

The time domain limits for the crosscorrelation function (122) in the invention are defined as the arrival of the maximum amplitude of the waveform isolated by the bandpass in trace one at depth one, less one half cycle time of the average frequency of the bandpass (lower bound), plus the time interval to the maximum amplitude of the isolated waveform in trace two at depth two, plus one cycle time of the average frequency of the bandpass (upper bound). Referring to FIG. 9, these limits are defined for a sampling rate of 40 μseconds(▲), and a bandpass of 40 to 85 Hz. The average frequency of the bandpass would be 62.5 Hz (cycles/second) or 16 msec. per cycle. The lower bound for the crosscorrelation (t1') would equal the maximum amplitude at t1 of the waveform less one half of one cycle time (16 msec. *½ = 8 msec.). In terms samples, a sampling rate of 400 μsec./sample over a 8 msec. desired limit correction would move back 20 samples from t1 to t1' (8 msec./0.40 msec./sample = 20 samples). A similar calculation would be provided to produce the upper bound (t2') by moving 40 samples from the maximum amplitude time, t2, of the waveform in trace 2 (Xk).

After these limits are determined (122), the crosscorrelation of the two dominant waveforms of the filtered data is performed (123) utilizing Equation 1, within the time domain defined by the limits calculated in Step 122.

The variable in the crosscorrelation function is $\tau$, the time difference between the two dominant waveforms' arrival. The point at which the crosscorrelation value is maximized is designated $\tau^*$, the actual difference in time it takes for the wavelet under study to travel from the source to depth 1, and from the source to depth 2. The crosscorrelation function illustrating the maximum value at $\tau^*$ is then displayed (124).

However, the value $\tau^*$ describes a time shift based on the travel paths of wavelets which do not travel on a strictly vertical plane. Thus, vector corrections must be made (125) to extrapolate difference in distance travelled by the traces taken at depth 1 and depth 2 based on the X and Y offsets of the respective traces. Once the vector corrections are made, ▲d is determined (126).

The velocity of the wavelet under study is calculated (127) from the corrected travel path distance difference between depth 1 and depth 2 of the cone penetrometer, ▲d, and $\tau^*$, the difference in arrival times.

Based on the crosscorrelation value at $\tau^*$ (123), the crosscorrelation coefficient is calculated (128) by dividing the crosscorrelation value by the standard deviation of the two wavelets at depth 1 and depth 2. This value is then displayed, along with the calculated velocity and depth, as an indicator of the accuracy of the calculated velocity estimate (129). This value ranges from 0.0 to 1.0. A value of 0.0 would indicate that the waveforms are not correlated at all and any velocity estimated from these signals would be unreliable. A value of 1.0 however would indicate that these signals are highly correlated and any velocity derived from these signals would be highly accurate, assuming the triggering mechanism was performing correctly.

What is claimed is:

1. A method for Seismic Cone Penetration Testing comprising the steps of inserting a seismic cone penetrometer to predetermined depths in the ground, generating a seismic source at the surface of the ground so that seismic waves propagate through the overburden adjacent the probe hole of the cone penetrometer which contains a seismic sensor, in addition to other sensors, employing said seismic sensor to provide an analogue signal in response to the seismic waves, converting analog seismic wave signal to digital seismic wave signal, and then, A) removing the D.C. shift of said digital seismic wave signal to force the mean amplitude of said signal to zero,
   B) normalizing the amplitude range of said digital seismic wave signal to a 1.0 to −1.0 unit range scale,
   C) displaying said digital seismic wave signal so the user can assess the quality of said digital seismic wave signal,
   D) recording said digital seismic wave signal in digital format on computer media for later processing,
   E) processing pairs of vertically offset and related digital seismic wave signals so recorded as in A) through D) above, by
      i) displaying the frequency spectra of said digital seismic wave signals by taking a Fast Fourier Transform of these inputs for user identification of desired spectra isolation, then digitally filtering these vertically offset and related pairs of digital seismic wave signals to remove unwanted frequencies, thereby isolating the waveforms of interest contained in a frequency range,
      ii) determining upper and lower bounds of the limits of said waveforms of interest so isolated with respect to time,
      iii) crosscorrelating with respect to the time difference, $\tau$, said waveforms of interest isolated in i) within the limits defined in ii) to determine the time difference, $\tau^*$, where the crosscorrelation value between said waveforms is maximum,
      iv) determining the actual distance difference travelled by said waveforms of interest from the horizontal displacement of the seismic source from the probe hole (X offset) and the vertical displacement of the seismic source from the surface of the ground (Y offset) to the respective depths of seismic cone data acquisition,
      v) determining from the time difference $\tau^*$ and the travel distance difference of said waveforms of interest, the average velocity of said waveforms over the depth increment under study,
      vi) indicating an estimate of accuracy of said average velocity calculated by dividing the value of the crosscorrelation function at $\tau^*$, by the variances of said waveforms of interest calculated within the limits determined in (ii), and
      vii) recording the velocity and accuracy estimates obtained in i) through vi) above, as well as user-specified site information, in digital format on computer media for a permanent record for further processing, printing, or evaluation.

2. A method of determining upper and lower bound time domain limits as in claim 1, which includes the definition of upper and lower bound time domain limits for the crosscorrelation function being defined as the arrival of the maximum amplitude of the waveform isolated by the bandpass applied to the digital seismic wave signal recorded closest to the surface of the ground, less one half cycle time of the average frequency of the bandpass (lower bound), plus the time interval to the maximum amplitude of the isolated waveform of the digital seismic wave signal recorded farthest from the surface of the ground, plus one cycle time of the average frequency of the bandpass (upper bound).

3. A method of determining average velocity as in claim 1 which estimates the average waveform velocity over the depth increment by dividing the estimated waveform travel path distance difference which is calculated using standard trigonometric vector analysis from point X, the horizontal offset of the seismic source from the probe hole, point Y, the vertical offset of the seismic source from the surface of the ground, and point Z, the vertical offsets of the cone penetrometer from the surface of the ground to the respective depths of seismic wave data acquisition, by the estimated time difference, $\tau^*$, where the crosscorrelation function is maximum, calculated in claim 1.

4. A method of displaying the frequency spectra as in claim 1, which includes the step of firstly applying a Hamming-Tukey window to the time domain of the data sets so that discontinuities are not passed into the Fast Fourier Transform functions which would result in frequency spectrum distortions in the frequency domain, and then obtaining the frequency boundaries in Hertz from user-specified input to define the frequency bandpass window.

5. A method of digital filtering as in claim 1, which includes the steps of using the inputs defined in claim 4 to construct a digital bandpass filter of Butterworth-type to isolate the waveforms so bound, and applying the digital bandpass filter so constructed to pairs of digital seismic wave signals specified for processing in claim 1.

6. A method of recording acquired digital seismic wave signal as in claim 1, which includes the steps of incorporating into the data record the relevant acquisition details concerning the record including sampling rate, depth, X and Y offsets of the seismic source relative to the probe hole and the surface of the ground, and trigger delay, for the purpose of reducing transcription errors and speeding processing.

* * * * *